(12) United States Patent
Walton

(10) Patent No.: US 10,956,861 B2
(45) Date of Patent: *Mar. 23, 2021

(54) APPARATUS AND METHOD FOR PREDICTIVE DISPATCH FOR GEOGRAPHICALLY DISTRIBUTED, ON-DEMAND SERVICES

(71) Applicant: Prahfit, Inc., Austin, TX (US)

(72) Inventor: Matthew Walton, Austin, TX (US)

(73) Assignee: Prahfit, Inc., Austin, TX (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/158,201

(22) Filed: Oct. 11, 2018

(65) Prior Publication Data

US 2019/0043006 A1 Feb. 7, 2019

Related U.S. Application Data

(63) Continuation of application No. 15/331,842, filed on Oct. 22, 2016, now Pat. No. 10,127,519.

(60) Provisional application No. 62/245,672, filed on Oct. 23, 2015.

(51) Int. Cl.
*G06Q 10/08* (2012.01)
*G06Q 30/02* (2012.01)
*G06Q 10/04* (2012.01)

(52) U.S. Cl.
CPC ........... *G06Q 10/087* (2013.01); *G06Q 10/04* (2013.01); *G06Q 10/083* (2013.01); *G06Q 30/0283* (2013.01)

(58) Field of Classification Search
CPC ...... G06Q 30/00; G06Q 10/087; G06Q 10/04; G06Q 10/083; G06Q 30/0283; G06Q 30/0284
USPC .......................................................... 705/28
See application file for complete search history.

(56) References Cited

U.S. PATENT DOCUMENTS

| | | | |
|---|---|---|---|
| 7,295,990 B1 * | 11/2007 | Braumoeller | G06Q 10/063 705/7.31 |
| 10,127,519 B2 * | 11/2018 | Walton | G06Q 10/083 |
| 2015/0356473 A1 * | 12/2015 | Christiance | G06Q 10/067 705/348 |
| 2017/0046653 A1 * | 2/2017 | Wilson | G06Q 10/083 |

* cited by examiner

*Primary Examiner* — Russell S Glass
(74) *Attorney, Agent, or Firm* — Pillsbury Winthrop Shaw Pittman, LLP

(57) ABSTRACT

Provided is a process of coordinating dynamic on-demand logistics to deliver goods or services between geographically distributed heterogeneous sources of inventory and geographically distributed consumers at scales exceeding metropolitan areas of more than one million residents, with more than 10,000 users, more than 1,000 vehicle operators, and more than 10 geographically distributed sources of inventory.

32 Claims, 4 Drawing Sheets

APPARATUS AND METHOD FOR PREDICTIVE DISPATCH FOR GEOGRAPHICALLY DISTRIBUTED, ON-DEMAND SERVICES

CROSS-REFERENCE TO RELATED APPLICATIONS

The present application is a continuation of U.S. patent application Ser. No. 15/331,842, filed 22 Oct. 2016, which claims the benefit of U.S. Provisional Patent Application 62/245,672, filed 23 Oct. 2015, the entire contents of which are hereby incorporated by reference for all purposes.

BACKGROUND

1. Field

The present disclosure relates generally to on-demand services and, more specifically, to distributed computing applications that predictively provide dispatch advice to providers of geographically distributed, on-demand services.

2. Description of the Related Art

On demand services are accounting for an increasing portion of economic activity. Examples include on-demand car ride services, such as those provided by Uber™ or Lyft™. Other examples include on-demand services for running errands, for instance, dropping off dry cleaning, delivering lunch, and transporting items. The universe of such services is expected to expand.

Many on-demand services are built around independent contractors who subscribe to an online service where tasks are hosted, e.g., accessing repositories of tasks hosted on a server via an application program interface (API) for the service using a native application executing on the service provider's or other end user's location-aware smart phone or other mobile computing device (e.g., tablet, in-dash automotive computer, smart watch, etc.). Such contractors and other end users select and prioritize among the available tasks to choose when and where they will provide services. Often these tasks are tied to geographic locations, for instance, a pickup or drop-off location or both. Further, often these tasks are compensated at rates that change based on the amount of demand, the amount of supply, or other factors. Other businesses use a mix of contractors and employees or purely employees to similar ends, using similar technology.

Individual contractors, business engaging in logistical operations, and employees of such businesses often face computationally challenging problems when selecting which tasks to undertake. These challenges can include predicting supply and demand and accounting for dynamic behavior of other service providers struggling to make similar predictions. Similarly, those creating the tasks among which the contractors select often face computationally challenging problems arising from the large number of different ways a set of tasks might be constructed in order to satisfy a collection of orders from consumers. Examples of relevant parameters include: the order a user will complete a task; the quickest way to a destination; how a new task is stacked ranked against other tasks; and notifying users of a driver's current location and estimated time of arrival.

SUMMARY

The following is a non-exhaustive listing of some aspects of the present techniques. These and other aspects are described in the following disclosure.

Some aspects include a process of coordinating dynamic on-demand logistics to deliver goods or services between geographically distributed heterogeneous sources of inventory and geographically distributed consumers at scales exceeding metropolitan areas of more than one million residents, with more than 10,000 users, more than 1,000 vehicle operators, and more than 10 geographically distributed sources of inventory, the method comprising: obtaining, with one or more processors, an order, the order indicating goods or services to be provided, and indicating a destination geolocation at which the goods or services are to be provided; identifying, with one or more processors, a plurality of candidate sources of inventory based on proximity to the destination geolocation; searching, with one or more processors, inventories of the candidate sources to determine qualified candidate sources in response to determining those qualified candidate sources have in inventory items needed to provision the goods or services specified by the order; identifying, with one or more processors, a one or more geographic zones based on those geographic zones containing at least one of the qualified candidate sources, at least some of the geographic zones having a plurality of qualified candidate sources; for each of the geographic zones: obtaining, with one or more processors, real-time geolocations of delivery vehicles within the respective geographic zone; obtaining, with one or more processors, real-time time estimates for delivery by the respective delivery vehicles; obtaining, with one or more processors, respective geolocations of qualified candidate sources within the respective geographic zone; obtaining, with one or more processors, respective amounts of inventory for the qualified candidate sources within the respective geographic zone; and obtaining, with one or more processors, other orders for which the respective geographic zone contains a qualified candidate source; and determining, with one or more processors, a delivery plan for the respective geographic zone based on the obtained real-time geolocations of the delivery vehicles, real-time time estimates for delivery, geolocations of the qualified candidate sources, amounts of inventory, and other orders, wherein determining a delivery plan comprises: determining a cost score for each of a plurality of candidate delivery scenarios, each delivery scenario including a given delivery vehicle and a given qualified candidate source; determining that the candidate delivery scenarios do not exceed the amounts of inventory; and selecting a plurality of delivery scenarios for the order and the other orders that reduces an aggregate cost score for the respective geographic zone; and sending, with one or more processors, at least one delivery plan to a mobile computing device of an operator of a delivery vehicle specified by the at least one delivery plan.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
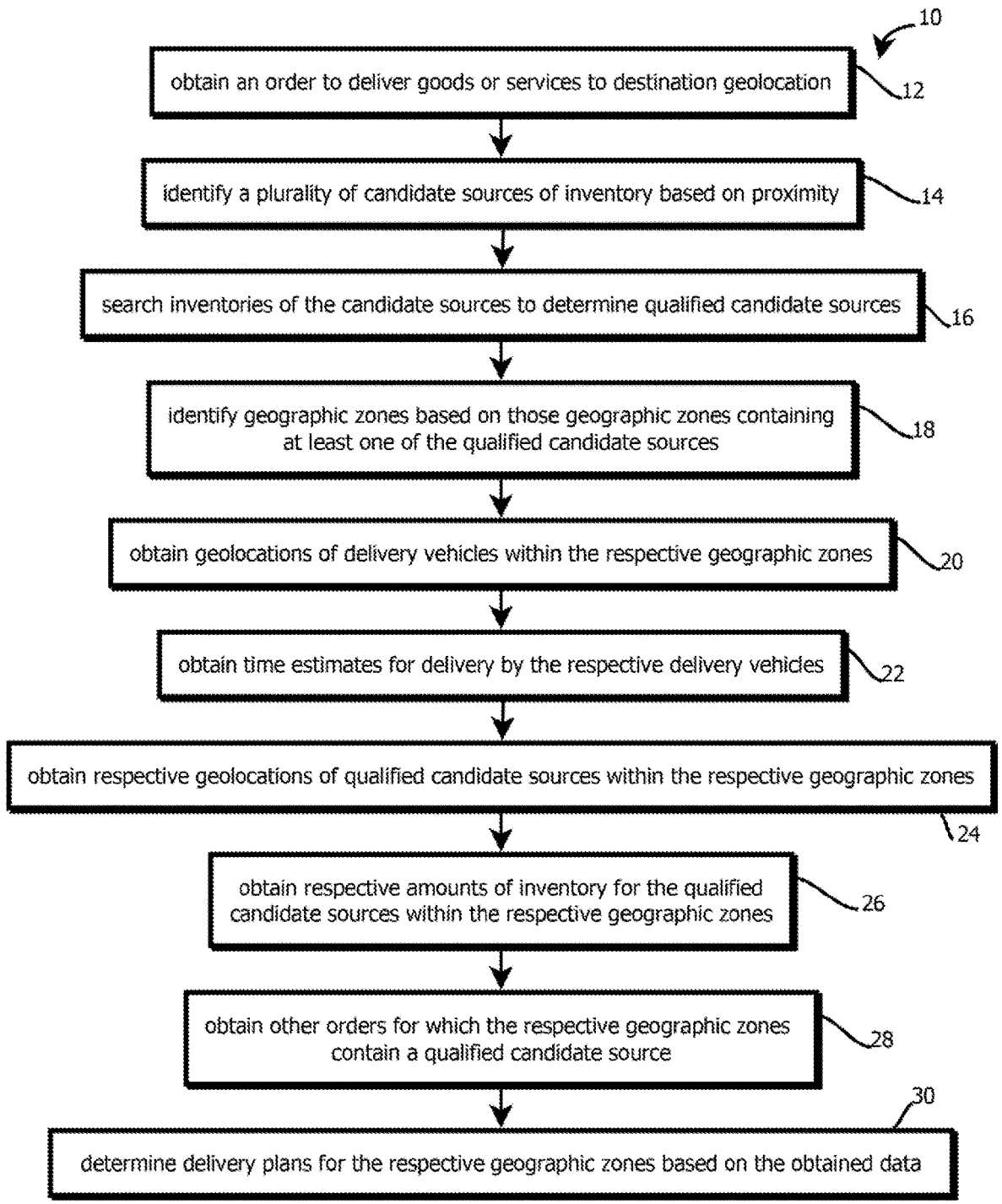
FIG. 1 is a flow chart of an example of a logistical process in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of logistics and computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments, assists service providers for on-demand services with selecting and managing tasks. Some embodiments may rank or select tasks based on various constraints provided by the service provider and based on an expected profitability or revenue associated with candidate tasks. In some cases, such rankings, scoring, or selections may be based on predictions of supply, demand, or other factors, like weather, traffic, lines at restaurants/stores, and rates of compensation.

In addition to mitigating the problems above, some embodiments alleviate other challenges arising in logistical operations, and particularly in distributed computing systems coordinating on-demand resources. For instance, for individual actors in such systems (e.g., businesses, employees, and contractors), it is often difficult to reliably assess whether any given task is profitable based on real-time overhead (e.g., expenses, time, mileage, and cascading effects imposing opportunity costs). Some embodiments filter or rate tasks according to measures of profitability and some embodiments predict profitable behaviors and alert these actors to such opportunities.

Some embodiments may acquire historical data from hosts of on-demand services and base the above-describe predictions on such data. For instance, some embodiments may acquire a training set based on historical profitability for individual service providers and train a machine learning model to predict the profitability of new tasks. For instance, such a model may be trained with stochastic gradient descent, using cross validation and bootstrap aggregation.

In some cases, providers of on-demand services provide services through multiple hosts, for instance competing ride-providing companies and the delivery companies. Some embodiments may select, score, or rank tasks across these hosts for an individual service provider to facilitate selection of tasks that are relatively desirable compared to selections within a single set of tasks from a single host.

Some embodiments may recommend geographic areas that are likely to be profitable based on such predictions, or score ranked or selected tasks based on association with such geographic areas. Some embodiments may detect weekly, monthly, or annual events in the above-described historical data and rank, score, or select tasks based on expected variations in supply or demand associated with those events. For instance, some embodiments may predict that a relatively large number of service providers will be in a geographic area at a time that the supply exceeds demand, and as a result, some embodiments may score tasks that leave a service provider in that geographic area as less desirable.

In some cases, the predicted desirability of tasks may be based on the profitability of a sequence of tasks (or tasks likely to arise) and the interrelationship between tasks in the sequences, for instance, the geographic distance between the beginning of one task and the end of the preceding task, or the providers residence if at the end of the sequence of tasks.

In some cases, such recommendations, selections, rankings may be based on group behavior, and in particular, predicted group behavior for a larger group, and directed behavior for a subgroup. For instance, a group of service providers may form a subgroup of a population of service providers within a city, and some embodiments may analyze tasks for the subgroup such that the collective profitability for the sub-group is increased or optimized. For instance, some embodiments may distribute members of the subgroup away from one another to avoid causing members of subgroup to compete for geographically proximate tasks. As sub groups grow, this may become particularly computationally complex, forming a type of a combinatorial optimization problem. To mitigate the scaling effects, some embodiments may parallelize the processing of data for different subgroups and employ heuristics to reduce complexity.

The problems faced by drivers in on-demand systems extended to the larger ecosystem. FIG. 1 shows an example of a process 10 that leverages the above-described techniques to improve upon a larger on-demand system. In some embodiments, the process of FIG. 1 is executed by a processor performing instructions encoded in a tangible, non-transitory, machine-readable medium (like those described below with reference to FIG. 4) to effectuate the operations described. The same is true of the other processes and functionality described herein. In some cases, a collection of computers may cooperate to effectuate this functionality, for example, in a distributed application, and references to memory or media storing instructions include scenarios in which different subsets of the instruction are stored on different instances of media associated with different processors in a distributed computing environment.

In some embodiments, the process 10 of FIG. 1 and corresponding systems executing that process feed optimization models based on geographic zones. In some cases, these zone-by-zone optimization models are continually (e.g., hourly in a batch process, or in response to events corresponding to the arrival of new data) optimized (e.g., arriving at a global or local optimum) based on real-time (e.g., within 15 minutes) location of resources (e.g., sources of inventory and delivery vehicles), availability, size requirements, and cost of delivery. Some embodiments may optimize according to availability, time, distance, predictions of demand and supply, and delivery window of time, within each geographic zone among a collection of pending orders.

Many existing logistics algorithms are more limited in the range of parameters over which those algorithms optimize, often relying on rough heuristics rather than determining optimal logistical scenarios. In many cases, this is due to the computational complexity of such tasks at commercially relevant scales. In many cases in on-demand use cases, entire countries, such as United States are served, often including major metropolitan areas having more than 1 million residents, by hundreds or thousands of drivers in each metropolitan area, in many cases pulling from tens or hundreds of different sources of inventory geographically redistributed over the geographic area. In some cases, certain types of logistical algorithms scale poorly, for instance, as combinatorial optimization problems in which each additional degree of freedom doubles the size of the problem (or more, e.g., increases the number of operations or amount of memory consumed factorially), which not be construed as indicating that the present techniques are limited to combinatorial optimization approaches or the any other feature described herein is not also amenable to variation. Further, many traditional logistics techniques are not well suited for the timescales and fluidity of parameters encountered in on-demand use cases. In many cases, the availability of resources fluctuates in on-demand use cases, and in many cases the desirability of various logistical scenarios varies over time as environmental and resource availability conditions change, for instance weather, traffic, and the like.

In some embodiments, the process of FIG. 1 may coordinate the operation of a collection of delivery vehicles (e.g., human driven or self driven, including drones and vehicles on the road). In some cases, a remote server system executing the process of FIG. 1 may communicate with mobile computing devices associated with those vehicles (e.g. smart phones of drivers or in-vehicle automotive systems), e.g., via cellular wireless networks and the Internet. In some cases, those mobile computing devices may include geolocation sensors, like satellite navigation sensors (e.g., GPS) and cellular signal triangulation sensors operative to determine a current geolocation of the mobile computing device, and those mobile computing devices may coordinate by sending those geolocations to the server system executing the process of FIG. 1. Further, the server system executing the process of FIG. 1 may send instructions to those mobile computing devices to effectuate the delivery scenarios described. Further, in some cases, the computing system executing the process of FIG. 1 may communicate with various third-party sources of data, like those described below with reference to FIG. 3, to obtain information about inventory, locations of inventory, environmental conditions, traffic conditions, and the like.

In some embodiments, multiple instances of the process of FIG. 1 may be executed concurrently, for instance, with one instance or collection of instances per geographic zone described below to parallelize operations and speed the operation of the process.

In some cases, the process 10 of FIG. 1 includes obtaining an order to deliver goods or services to a destination geolocation, as indicated by Block 12. In some cases, this order may be received via an API or Web server, for instance, from a computing device operated by a consumer, like at the consumer's home or work. In some cases, the order may specify a destination geolocation, a priority of the order, goods or services to be delivered with the order, a time of the order, and a delivery time of the order. In some cases, orders may be received at relatively large volume, such as at a rate of more than 100 per minute, and in many cases more than 1000 per minute in many commercially relevant use cases. In some cases, destination geolocations may be specified as a street address, as a latitude and longitude, or with various other encodings. In some cases, the destination geolocation is a current geolocation of the consumer sensed by a location sensor of the consumer's mobile computing device that submitted the order.

Next, some embodiments may identify a plurality of candidate sources of inventory based on proximity, as indicated by block 14. In some cases, the candidate sources of inventory are brick-and-mortar stores or warehouses geographically distributed over some area, such as over an entire country or continent or the world. In some cases, the candidate sources of inventory are sources of inventory maintained by third parties, such as multiple, different retail chain stores. In some cases, inventory amounts may be obtained via an API hosted by a server operated by each of the respective entities having a source of inventory. In some cases, the system executing the process 10 may have records corresponding to thousands or tens of thousands of sources of inventory distributed over a country, and some embodiments may filter those sources of inventory based on their proximity (e.g. Euclidean distance, driving distance, driving time, or the like) to the destination geolocation of the order. In some cases, only a subset of these sources of inventory may be compared to the geolocation of the order in order to expedite operations and avoid performing pairwise difference calculations across a large data set (or some embodiments may perform the pairwise calculations over the whole set). For example, some embodiments may identify a subset of the sources of inventory within a grid square or other geographic zone, for example, those geographic zones described below, and then determine distances or other measures of proximity. In some cases, the identification may include determining that the measure of proximity satisfies a threshold, for example, is less than a threshold distance, drivetime, drive distance, or the like. In some cases, the number of candidate sources of inventory may still be relatively large, for example, more than 5, more than 50, or more than 500, in relatively dense geographic areas.

Next, some embodiments may search inventories of the candidate sources to determine qualified candidate sources, as indicated by block 16. In some cases, this may include querying inventory amounts via APIs of servers operated by entities having the various candidate sources. In some cases, the API responses may indicate the geolocation of each candidate source having items in inventory, amount of items in inventory, and attributes of the items in inventory, like weight or volume, as well as cost and available discounts, for example, coupons that may apply. In some cases, the responses may also indicate reimbursement information in an affiliate sales or vendor relationship, for example, a percentage or flat fee reward in exchange for effectuating a sale or delivery. In some cases, the responses may indicate whether the goods or services require any special attributes of a vehicle for transport, for example, armored security vehicles or refrigerated vehicles.

In some cases, some embodiments may determine that a subset of the candidate sources of inventory are qualified candidate sources of inventory in response to determining that those qualified candidate sources of inventory have in inventory items needed to provision the goods or services specified by the order. In some cases, there may still be a relatively large number of qualified candidate sources of inventory, for instance, more than 5, more than 50, or more than 500.

In some cases, no qualified candidate sources are identified, and some embodiments may respond by sending the consumers computing device instructions to display an input by which the consumer indicates that they wish to search in a larger geographic area (or other zone), e.g., for more money. In response, some embodiments may repeat the above processes for other areas.

Some embodiments may identify geographic zones based on those geographic zones containing at least one of the qualified candidate sources of inventory, as indicated by block 18. In some cases, some of the geographic zones may include multiple qualified candidate sources of inventory. In some cases, only one geographic zone is identified and the qualified candidate sources are identified based on their presence within that geographic zone. In some embodiments, geographic zones may be arranged hierarchically, for instance, by ZIP Code, county, and state, and some qualified candidate sources of inventory may reside within multiple geographic zones overlaying one another. In some cases, the geographic zones overlap, for instance, by 50%, while being within the same level of a hierarchy or in the absence of a hierarchy. In such cases, the below described optimization processes may be performed twice, once with the overlap in each zone, and the more optimal (in the aggregate) arrangement may be chosen. Thus, in some cases, some candidate sources of inventory may reside in multiple geographic zones. In some cases, the number and arrangement of geographic zones may be determined by balancing between available computing resources and suboptimal optimization results due to some embodiments not optimizing across geographic zones. (Though some embodiments may also optimize across geographic zones, as the various techniques described herein are independently useful.)

Next, some embodiments may obtain geolocations of delivery vehicles within the respective geographic zones, as indicated by block 20. In some cases, the locations may be real-time locations, for instance, current within 15 minutes. In some cases, the geolocations may be reported by a native application executing on mobile computing devices associated with those respective vehicles.

Next, some embodiments may obtain time estimates for delivery by the respective delivery vehicles, as indicated by block 22. In some cases, this may include obtaining a current list of tasks claimed or otherwise assigned to the respective delivery vehicles, in some cases in a ranked order with associated priorities. In some cases, time estimate determination may include inserting the current order into that ranked list according to priority and estimating amount of time to delivery including higher-ranked items. In some cases, the time estimates may be based on a predicted route, predicted traffic conditions, and predicted weather conditions. Thus, in some cases, a given time estimate may include determining that the given delivery vehicle would need to make three pickups and deliveries along three routes before getting to a delivery corresponding to the current order. And some embodiments may predict that traffic conditions during the second of those three pickup and deliveries will be particularly bad, and attribute a relatively long duration of time. The cumulative duration of time may be recorded as the estimated time estimate for delivery for the respective vehicle for the respective order. In some cases, this may be performed over a relatively large number of vehicles, such as several hundred or several thousand. In some embodiments, a distributed parallel computing framework may be used to implement such estimates. For example, some embodiments may implement a map-reduce algorithm by which different time estimates are mapped to different computing devices or processes, and those having less than a threshold duration of delivery estimate may be reduced out of the algorithm.

Next, some embodiments may obtain respective geolocations of qualified candidate sources within the respective geographic zones, as indicated by block 24. In some cases, geolocations may be obtained in the same API response that provides inventories of the candidate sources. Or in some cases, a repository may be maintained in a geographic information system, indicating geolocations of various candidate sources.

Next, some embodiments may obtain respective amounts of inventory for the qualified candidate sources within the respective geographic zones, as indicated by block 26. Again, this information may be obtained via the above-described API requests and responses.

Next, some embodiments may obtain other orders for which the respective geographic zones contain a qualified candidate source, as indicated by block 28. In some cases, the zones may be relatively large, for example, more than 1 km$^2$, like more than 10 km$^2$, and a relatively large number of orders may arrive at a relatively high rate. Thus, some embodiments may obtain more than 10, more than 100, or more than 1000 orders pertaining to various ones of the zones, and in some cases pertaining to multiple zones. In some cases, the other orders may be obtained in the above-described fashion, such as from other client computing devices of other consumers. In some cases, the other orders may be obtained within a relatively short trailing duration over which an optimization occurs, like within the preceding 5 minutes, preceding 10 minutes, or proceeding hour. Some embodiments may batch orders and optimize within a collection of orders using a process described below with reference to FIG. 2.

Next, some embodiments may determine delivery plans for the respective geographic zones based on the obtained data, as indicated by block 30. In some cases, this may include executing the process described below with reference to FIG. 2 for each respective zone to determine an optimal (e.g., global or local optimum) assignment of orders or ranking of orders for different scenarios in which the orders are provided (e.g., pickup location, delivery vehicle, and sequence of tasks by the delivery vehicle). As noted, in some cases, multiple sources of inventory may be available within a geographic zone, and the closest source of inventory for a given destination may not be an optimal pickup location when the zone as a whole and the related orders are taken into account. For example, a given pickup location that is further from the destination may be desirable, because an earlier drop off destination places a vehicle with a relatively short set of tasks near that particular source of inventory. In another example, a less-than-closest geographic source of inventory to a destination may be selected because inventory levels at other sources of inventory that are closer are smaller and a relatively large number of orders is expected later in the day when traffic conditions are worse and the penalty for longer transit distance is greater. Thus, some embodiments may advance in time a relatively long trip when traffic is not particularly bad to avoid a relatively long trip later due to depleted inventory levels. By planning a few moves ahead and accounting for the zone as a whole, some embodiments may obtain relatively efficient routing of delivery vehicles and allocation of orders to sources of inventory.

In some embodiments, the determine delivery plans may be sent to the mobile computing devices of the respective delivery vehicles. In some cases, the delivery plans may indicate a reward, such as a monetary award, and the delivery vehicle operator may elect to accept the reward (causing a response to be sent to the server, which registers the order as claimed) or decline, in which case the order may be resubmitted for the next optimization. In some cases, operators of delivery vehicles may simply not respond, and some embodiments may determine whether more than in a threshold amount of time has elapsed without a response, in which case, in response, some embodiments may withdraw the delivery plan from that delivery vehicle operator and resubmit the order for the next round of optimization. In some embodiments, delivery plans may be assigned to delivery vehicles, and the operator of the delivery vehicles may not have an option to decline, for instance, those delivery vehicles operated by employees rather than contractors.

Figure 2:
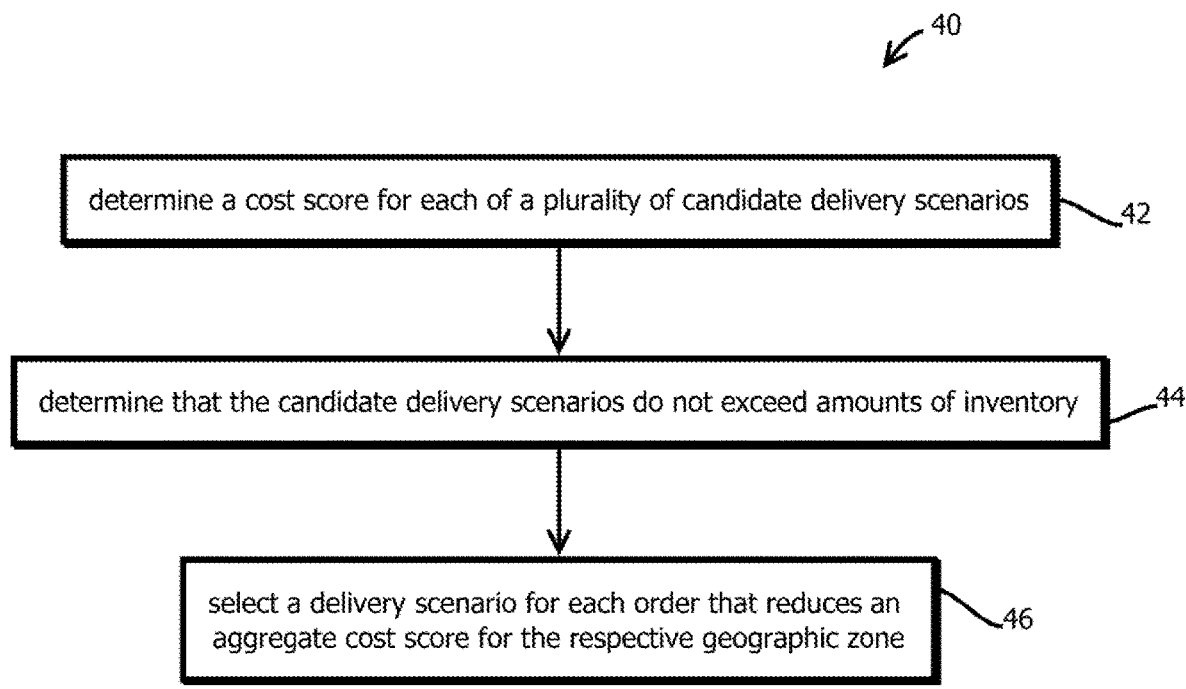
FIG. 2 is a flowchart of an example of an optimization process that may be performed in the logistical process of FIG. 1.

FIG. 2 shows an example of a process 40 to determine a set of optimal delivery plans within a geographic zone 40. In some cases, the process 40 may be executed in the course of operation 30 of FIG. 1. In some embodiments, the process 40 may be repeated concurrently for multiple delivery zones, for instance, on multiple computing devices operating in parallel, to expedite relatively computationally complex optimization algorithms.

In some embodiments, the process 40 includes determining a cost score for each of a plurality of candidate delivery scenarios, as indicated by block 42. In some cases, the cost score is based on a weighted combination of a variety of different factors, such as an amount of available delivery vehicles, amounts of goods and inventory, distances from various sources of inventory to current and likely later predicted geolocations of delivery vehicles, distances from various sources of inventory to various delivery locations, current and predicted traffic and weather, and the like.

A variety of different techniques may be implemented to determine cost scores. For instance, some embodiments may determine based on an order that the order has delivery window of two hours; that a time-of-day factor weighted at a given percentage indicates a large effect due to rush hour occurring in the delivery window; that a weather factor weighted at a different percentage has a smaller effect due to predicted good weather; that available vehicle inventory for delivery is relatively large, with another weighting; and that an inventory-location factor at another weighting contributes with an intermediate effect. These weighted factors may be summed in an aggregate cost score, and the cost score may be modeled for each of a plurality of drivers in different candidate delivery scenarios.

In some embodiments, the process 40 includes determining that the candidate delivery scenarios do not exceed amounts of inventory, as indicated by block 44. Some embodiments may determine that a given delivery scenario is infeasible, because amounts of inventory within a source of inventory may be or are expected to be depleted. Further, some embodiments may filter out those candidate delivery scenarios that do not accord with size, weight, refrigeration, security, or other constraints that limit the delivery scenario to a subset of the available vehicles for delivery.

Some embodiments may then select a delivery scenario for each order that reduces an aggregate cost score for the respective geographic zone, as indicated by block 46. References to reductions and cost scores should be read as synonymous with increases and fitness scores, as arbitrary designations in sign do not affect the underlying functionality. In some cases, each delivery scenario serving as a candidate may affect which other delivery scenarios are viable, for instance by taking a given delivery vehicle's time, placing a given delivery vehicle at a destination geolocation at a given time that interferes with other scenarios, or by taking inventory from a given geolocation. In some cases, the optimization may present a combinatorial optimization task. Focusing on geographic zones is expected to render that task more tractable, by bounding the number of interactions with other, geographically remote scenarios less likely to affect optimization choices.

To determine an optimal delivery scenario for each order, some embodiments may execute a gradient descent on the aggregate cost function for the collection of orders (e.g. a sum of the cost functions for each delivery scenario to be applied in a given configuration). In another example, some embodiments may model the universe of viable delivery scenario assignments as an energy function and use a simulated annealing algorithm to determine a minimum value for that energy function, with the arrangement of delivery scenarios in that minimum value corresponding to an optimal allocation of delivery scenarios to orders.

Figure 3:
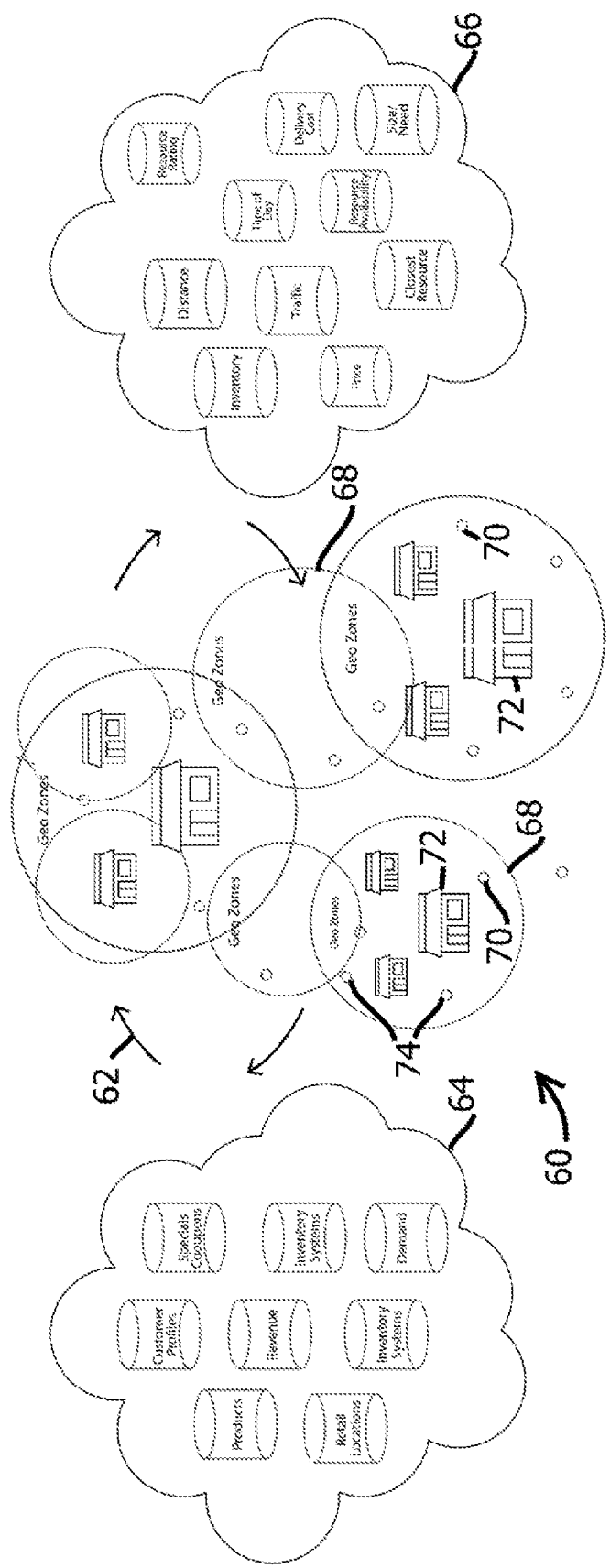
FIG. 3 is a diagram of information flow and geographic zones represented in a data model used in the processes of FIGS. 1 and 2.

FIG. 3 shows a diagram 60 indicating an example of the relationship between various data sources and geographic zones in a data model of the above-describe processes. In some cases, the optimization may be executed iteratively, for instance, as indicated by arrow 62 forming a loop. In some embodiments, the data sources include various local or external data repositories 64, like customer profiles, specials and coupons, revenue, products, retail locations, inventory systems, demand indicators, and inventory systems. In some cases, additional environmental data repositories 66 may provide additional data factored into the optimization, including distances, resource ratings, time of day, inventory, traffic, price, closest resources, resource availability, size/need, and delivery costs. As illustrated, various geographic zones 68 may encompass a plurality of sources of inventory 72 and various delivery vehicles 70 and drop off or delivery locations 74. In some embodiments, the geographic zones are circular radii of areas within a threshold distance, or in some embodiments, the geographic zones are nonoverlapping noncircular areas, like ZIP Codes, grid squares, and the like.

In some cases, various model parameters may be adjusted based on feedback. The system continually processes optimization models based on predicted zones of highest demand. These zones may be broken out into regions and distances around known brick and mortar fulfillment stores, along with demand forecasting, and available resources.) Ring of highest optimization for the geographic zones my be determined from integration with E-Commerce systems, Zip Codes, discount/Couponing system, known patterns from and available analytics from logged operations in previous use, e.g., over a trailing year.

In some cases, the system sends updates to the computing devices of the consumer and the delivery vehicle operator. Predicted demand may be determined and delivered to the on-demand driver or courier service, so they can understand where they need to be to maximize their revenue or earnings. Consumers may be notified when inventory is found, a delivery scenario is claimed by (or otherwise assigned to) a delivery vehicle operator, and when time estimates for deliver change. Further, inventory systems for sources of inventory may be updated to indicate that certain items are claimed in advance of pickup in response to these events. In some cases, employees of the entity providing the inventory may receive an instruction to pull the inventory in advance of pickup.

In some cases, the merchandise owner operating a source of inventory has the ability to continually monitor the status of the package being delivered, and the owner has the ability to set rules around the type of drivers they want to use, and how they pay for each delivery. In some cases, candidate delivery scenarios may be filtered by these criteria.

The present techniques may facilitate various use cases, in some embodiments. In some cases, an on demand driver, or business, may configure the system with a cost profile, e.g., mile cost, fuel, vehicle cost, etc. which may be different from other drivers or businesses. Some embodiments may capture some or all of related expenses through the system too (e.g., via entry by a native application on a mobile computing device)—which may be used to calculate and report an operational cost and how much the respective entity will need in compensation for a given task to break even. In some cases, these amounts may be displayed adjacent a corresponding candidate delivery scenario to drivers or business owners, along with an optin to rejection or accept the scenario, or in some cases, unprofitable scenarios may be rejected automatically. Some configurations may include related goals, and groups of tasks may be configured to meet those goals. Some embodiments may determine an overall per mile/per hour cost as a filter to only be presented with opportunities that fit this criteria This way, some embodiments only presented jobs that fit a corresponding profitability model, and users may tweak the model if I they experience fewer jobs than desired, e.g., by moving a profit slider lower to increase volume—or increase it to make me more profitable, in a client-side user interface by which a profile is configured. Some embodiments afford similar features at the business level, e.g., a small courier or delivery business may take feeds from this system, input similar configures, have similar filtering according to criteria, and lower their profitability model threshold to increase workers capacity, or decrease it if I over capacity.

Some embodiments may signal to participants (e.g., drivers and businesses) dynamic indicators of demand in zones within some threshold distance, e.g., in a user interface of client-side computing devices, like in an SMS or mobile OS notification. For instance, an on-demand driver may not be currently accepting new tasks, but the system may alert the driver to a change in (or predicted change in) demand that rewards the driver more heavility. The system may alert the driver to "be available" due to predicted or ongoing demand, e.g., based on their profitability settings. This is expected to address another big issue in the market—both in long haul and local delivery—areas in which is most people do not truly understand the cost of business, or how to shift to become more profitable. Some use cases are expected to apply both at the driver/contractor/business level, but also systematically—how well a resource behaves—is rated, timely, bonded, insured, etc., such that entities participating in the system can filter undesirable resources from their delivery scenarios.

Figure 4:
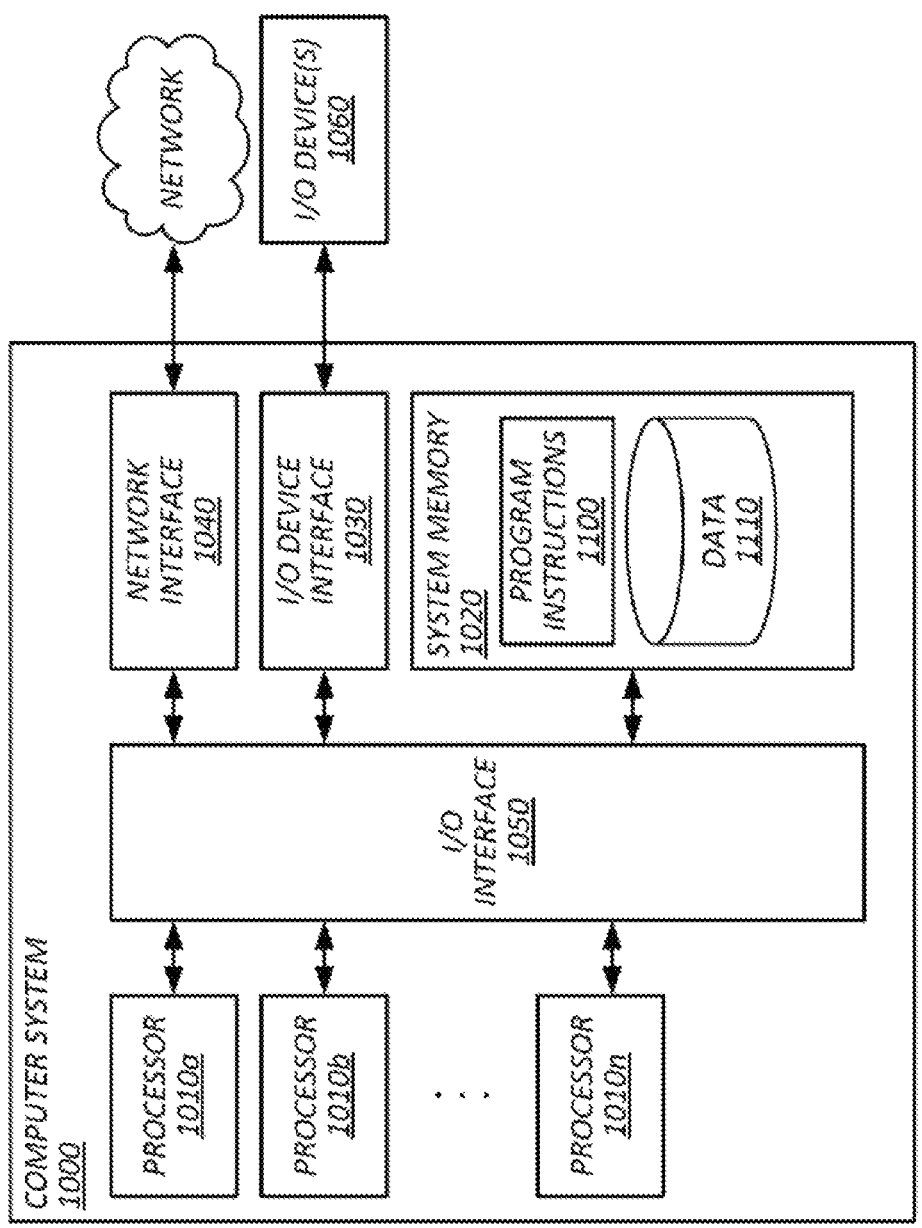
FIG. 4 is a block diagram of an example of a computer system by which the above-described examples may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of coordinating dynamic on-demand logistics to deliver goods or services between geographically distributed heterogeneous sources of inventory and geographically distributed consumers at scales exceeding metropolitan areas of more than one million residents, with more than 10,000 users, more than 1,000 vehicle operators, and more than 10 geographically distributed sources of inventory, the method comprising: obtaining, with one or more processors, an order, the order indicating goods or services to be provided, and indicating a destination geolocation at which the goods or services are to be provided; identifying, with one or more processors, a plurality of candidate sources of inventory based on proximity to the destination geolocation; searching, with one or more processors, inventories of the candidate sources to determine qualified candidate sources in response to determining those qualified candidate sources have in inventory items needed to provision the goods or services specified by the order; identifying, with one or more processors, a one or more geographic zones based on those geographic zones containing at least one of the qualified candidate sources, at least some of the geographic zones having a plurality of qualified candidate sources; for each of the geographic zones: obtaining, with one or more processors, real-time geolocations of delivery vehicles within the respective geographic zone; obtaining, with one or more processors, real-time time estimates for delivery by the respective delivery vehicles; obtaining, with one or more processors, respective geolocations of qualified candidate sources within the respective geographic zone; obtaining, with one or more processors, respective amounts of inventory for the qualified candidate sources within the respective geographic zone; and obtaining, with one or more processors, other orders for which the respective geographic zone contains a qualified candidate source; and determining, with one or more processors, a delivery plan for the respective geographic zone based on the obtained real-time geolocations of the delivery vehicles, real-time time estimates for delivery, geolocations of the qualified candidate sources, amounts of inventory, and other orders, wherein determining a delivery plan comprises: determining a cost score for each of a plurality of candidate delivery scenarios, each delivery scenario including a given delivery vehicle and a given qualified candidate source; determining that the candidate delivery scenarios do not exceed the amounts of inventory; and selecting a plurality of delivery scenarios for the order and the other orders that reduces an aggregate cost score for the respective geographic zone; and sending, with one or more processors, at least one delivery plan to a mobile computing device of an operator of a delivery vehicle specified by the at least one delivery plan.

2. The method of clause 1, comprising: determining that more than a threshold amount of time has elapsed since sending the at least one delivery plan to the operator of the delivery vehicles specified by the at least one delivery plan and, in response, adding the order to another queue to be re-assigned.

3. The method of any of clauses 1-2, comprising: determining that the order includes multiple items that are individually or collectively larger than a threshold weight or volume and, in response, when determining a delivery plan, determining that the candidate delivery scenarios include a delivery vehicle capable of transporting the multiple items.

4. The method of any of clauses 1-3, comprising: determining that the order includes multiple items that are individually or collectively larger than a threshold weight or volume and, in response, sending the order to a courier service.

5. The method of of any of clauses 1-4, comprising: ranking delivery scenarios based on cost scores; identifying a plurality delivery scenarios satisfying a threshold ranking; designating in memory inventory corresponding to the identified delivery scenarios as pending.

6. The method of clause 5, wherein the threshold ranking is the top three delivery scenarios having the three lowest cost scores 7. The method of of any of clauses 1-6, comprising: repeatedly optimizing delivery scenarios in each geographic zone more often than once per hour, each optimizing including more than 10 orders, more than 100 delivery vehicles, and more than 5 sources of inventory.

8. The method of of any of clauses 1-7, comprising: receiving feedback from consumers, candidate sources, and operators of delivery vehicles; and adjusting parameters in an algorithm by which delivery plans are selected based on the feedback.

9. The method of of any of clauses 1-8, comprising: determining aggregate measures of demand from a plurality of the geographic zones; and sending the aggregate measures of demand to mobile computing devices of operators of delivery vehicles to rebalance the location of delivery vehicles among the geographic zones.

10. The method of of any of clauses 1-9, wherein: determining a delivery plan is based on a customer profile of a customer specifying the order.

11. The method of of any of clauses 1-10, wherein: determining a delivery plan is based on an estimated amount of revenue for each delivery scenario.

12. The method of of any of clauses 1-11, wherein: determining a delivery plan is based on discounts associated with at least some delivery scenarios.

13. The method of of any of clauses 1-12, wherein: determining a delivery plan is based on estimated traffic delays associated with at least some delivery scenarios.

14. The method of of any of clauses 1-13, wherein: determining a delivery plan is based on an age of the order.

15. The method of of any of clauses 1-14, wherein: determining a delivery plan is based on a priority of the order.

16. The method of of any of clauses 1-15, wherein: determining a delivery plan is based on a simulated annealing algorithm that identifies a minimum or maximum of a simulated energy landscape corresponding to aggregate cost score for the respective geographic zone.

17. The method of of any of clauses 1-17, comprising: receiving another order from a client computing device; determining that there are no qualified candidate sources within a threshold distance to a destination geolocation of the other order; and sending the client computing device instructions to display a user interface with an input by which a user inputs a request to increase the threshold distance.

18. The method of of any of clauses 1-17, wherein: determining a delivery plan is based on a gradient descent of the aggregate cost score for the respective geographic zone.

19. The method of of any of clauses 1-18, wherein: determining a delivery plan comprises steps for optimizing delivery scenarios within a geographic zone.

20. A tangible, non-transitory, machine-readable medium storing instructions that when executed by a data processing apparatus cause the data processing apparatus to perform operations comprising: the methods of any of clauses 1-19.

21. A system, comprising: one or more processors; and memory storing instructions that when executed by the processors cause the processors to effectuate operations comprising: the methods of any of clauses 1-19

What is claimed is:

1. A method of coordinating dynamic on-demand logistics to deliver goods or services between geographically distributed heterogeneous sources of inventory and geographically distributed consumers, the method comprising:
  obtaining, with one or more processors, an order, the order indicating goods or services to be provided, and indicating a destination geolocation at which the goods or services are to be provided;
  identifying, with one or more processors, a plurality of candidate sources of inventory based on proximity to the destination geolocation;
  searching, with one or more processors, inventories of the candidate sources to determine qualified candidate sources in response to determining those qualified candidate sources have in inventory items needed to provision the goods or services specified by the order;

identifying, with one or more processors, a one or more geographic zones based on those geographic zones containing at least one of the qualified candidate sources, at least some of the geographic zones having a plurality of qualified candidate sources;

for each of the geographic zones:
  obtaining, with one or more processors, real-time geolocations of entities capable of effecting the providing of the goods or services within the respective geographic zone;
  obtaining, with one or more processors, real-time time estimates for providing of the goods or services by the respective entities;
  obtaining, with one or more processors, respective geolocations of qualified candidate sources within the respective geographic zone;
  obtaining, with one or more processors, respective amounts of inventory for the qualified candidate sources within the respective geographic zone; and
  obtaining, with one or more processors, other orders for which the respective geographic zone contains a qualified candidate source; and
  determining, with one or more processors, a delivery plan for the respective geographic zone based on the obtained real-time geolocations of the entities, real-time time estimates for providing of the goods or services, geolocations of the qualified candidate sources, amounts of inventory, and other orders, wherein determining a delivery plan comprises:
    determining a cost score for each of a plurality of candidate delivery scenarios, each delivery scenario including a given entity capable of effecting the providing of the goods or services and a given qualified candidate source;
    determining that the candidate delivery scenarios do not exceed the amounts of inventory; and
    selecting a plurality of delivery scenarios for the order and the other orders that reduces an aggregate cost score for the respective geographic zone; and sending, with one or more processors, at least one delivery plan to a computing device associated with an entity specified by the at least one delivery plan.

2. The method of claim 1, comprising:
determining that more than a threshold amount of time has elapsed since sending the at least one delivery plan to the computing device associated with the entity specified by the at least one delivery plan and, in response, adding the order to another queue to be re-assigned.

3. The method of claim 1, comprising:
determining that the order includes multiple items that are individually or collectively larger than a threshold weight or volume and, in response, when determining a delivery plan, determining that the candidate delivery scenarios include an entity capable of transporting the multiple items, wherein the entity is a delivery vehicle capable of transporting the multiple items and selected based in part on a profile associated with the entity.

4. The method of claim 1, comprising:
determining that the order includes multiple items that are individually or collectively larger than a threshold weight or volume and, in response, sending the order to a courier service.

5. The method of claim 1, comprising:
ranking delivery scenarios based on cost scores;
identifying a plurality delivery scenarios satisfying a threshold ranking;
designating in memory inventory corresponding to the identified delivery scenarios as pending.

6. The method of claim 5, wherein the threshold ranking is the top three delivery scenarios having the three lowest cost scores.

7. The method of claim 1, comprising:
repeatedly optimizing delivery scenarios in each geographic zone more often than once per hour, each optimizing including more than 10 orders, more than 100 entities capable of effecting the providing of goods or services, and more than 5 sources of inventory, wherein the different entities have different capabilities of effecting the providing of different goods or services specified in respective profiles.

8. The method of claim 1, comprising:
receiving feedback from consumers, candidate sources, and operators of delivery vehicles; and
adjusting parameters in an algorithm by which delivery plans are selected based on the feedback.

9. The method of claim 1, comprising:
determining aggregate measures of demand from a plurality of the geographic zones; and
sending the aggregate measures of demand to mobile computing devices of operators of delivery vehicles to rebalance the location of delivery vehicles among the geographic zones.

10. The method of claim 1, wherein:
determining a delivery plan is based on a customer profile of a customer specifying the order.

11. The method of claim 1, wherein:
determining a delivery plan is based on an estimated amount of revenue for each delivery scenario.

12. The method of claim 1, wherein:
determining a delivery plan is based on discounts associated with at least some delivery scenarios.

13. The method of claim 1, wherein:
determining a delivery plan is based on estimated traffic delays associated with at least some delivery scenarios.

14. The method of claim 1, wherein:
determining a delivery plan is based on an age of the order.

15. The method of claim 1, wherein:
determining a delivery plan is based on a priority of the order.

16. The method of claim 1, wherein:
determining a delivery plan is based on a simulated annealing algorithm that identifies a minimum or maximum of a simulated energy landscape corresponding to aggregate cost score for the respective geographic zone.

17. The method of claim 1, comprising:
receiving another order from a client computing device;
determining that there are no qualified candidate sources within a threshold distance to a destination geolocation of the other order; and
sending the client computing device instructions to display a user interface with an input by which a user inputs a request to increase the threshold distance.

18. The method of claim 1, wherein:
determining a delivery plan is based on a gradient descent of the aggregate cost score for the respective geographic zone.

19. The method of claim 1, wherein:
determining a delivery plan comprises steps for optimizing delivery scenarios within a geographic zone.

20. A system, comprising:
one or more processors; and
memory storing instructions that when executed by at least some of the processors effectuate operations comprising:
  obtaining an order, the order indicating goods or services to be provided, and indicating a destination geolocation at which the goods or services are to be provided;
  identifying a one or more geographic zones including the destination geolocation and within which the goods or service to be provided are identified as available within a given proximity to the destination geolocation;
  for each of the geographic zones:
    obtaining real-time geolocations of entities capable of effecting the providing of the goods or services within the respective geographic zone;
    obtaining real-time time estimates for providing of the goods or services by the respective entities; and
    obtaining other orders for which the respective geographic zone, wherein a first one of the other orders specifies goods to be provided and is selected based on respective geolocations of qualified candidate sources of the goods to be provided within the respective geographic zone, a qualified candidate source having an amount of inventory items needed to fill at least some the first one of the other orders; and
    determining a delivery plan for the respective geographic zone based on the obtained real-time geolocations of the entities and real-time time estimates for providing of the goods or services for the order, and the geolocations of the qualified candidate sources and amounts of inventory for the first one of the other orders, and additional ones of the other orders, wherein determining a delivery plan comprises:
      determining a cost score for each of a plurality of candidate delivery scenarios, each delivery scenario including a given entity capable of effecting the providing of the goods or services and a given qualified candidate source;
      determining that the candidate delivery scenarios do not exceed the amounts of inventory; and
      selecting a plurality of delivery scenarios for the order and the other orders that reduces an aggregate cost score for the respective geographic zone; and
  sending at least one delivery plan to a computing device associated with an entity specified by the at least one delivery plan.

21. The system of claim 20, the operations comprising:
determining that more than a threshold amount of time has elapsed since sending the at least one delivery plan to the computing device associated with the entity specified by the at least one delivery plan and, in response, adding the order to another queue to be re-assigned.

22. The system of claim 20, the operations comprising:
determining that the order includes multiple items that are individually or collectively larger than a threshold weight or volume and, in response, when determining a delivery plan, determining that the candidate delivery scenarios include an entity capable of transporting the multiple items, wherein the entity is a delivery vehicle capable of transporting the multiple items and selected based in part on a profile associated with the entity.

23. The system of claim 20, the operations comprising:
determining that the order includes multiple items that are individually or collectively larger than a threshold weight or volume and, in response, sending the order to a courier service.

24. The system of claim 20, the operations comprising:
ranking delivery scenarios based on cost scores;
identifying a plurality delivery scenarios satisfying a threshold ranking;
designating in memory inventory corresponding to the identified delivery scenarios as pending.

25. The system of claim 20, the operations comprising:
repeatedly optimizing delivery scenarios in each geographic zone more often than once per hour, each optimizing including more than 10 orders, more than 100 entities capable of effecting the providing of goods or services, and more than 5 sources of inventory, wherein the different entities have different capabilities of effecting the providing of different goods or services specified in respective profiles.

26. The system of claim 20, the operations comprising:
receiving feedback from consumers, candidate sources, and operators of delivery vehicles; and
adjusting parameters in an algorithm by which delivery plans are selected based on the feedback.

27. The system of claim 20, the operations comprising:
determining aggregate measures of demand from a plurality of the geographic zones; and
sending the aggregate measures of demand to mobile computing devices of operators of delivery vehicles to rebalance the location of delivery vehicles among the geographic zones.

28. The system of claim 20, wherein:
determining a delivery plan is based on estimated traffic delays associated with at least some delivery scenarios.

29. The system of claim 20, wherein:
determining a delivery plan is based on a simulated annealing algorithm that identifies a minimum or maximum of a simulated energy landscape corresponding to aggregate cost score for the respective geographic zone.

30. The system of claim 20, the operations comprising:
receiving another order from a client computing device;
determining that there are no qualified candidate sources within a threshold distance to a destination geolocation of the other order; and
sending the client computing device instructions to display a user interface with an input by which a user inputs a request to increase the threshold distance.

31. The system of claim 20, wherein:
determining a delivery plan is based on a gradient descent of the aggregate cost score for the respective geographic zone.

32. The system of claim 20, wherein:
determining a delivery plan comprises steps for optimizing delivery scenarios within a geographic zone.

* * * * *